United States Patent [19]
Gruffaz et al.

[11] 3,903,036
[45] Sept. 2, 1975

[54] POLYAMIDE-IMIDE SOLUTIONS

[75] Inventors: Max Gruffaz, La Mulatiere; Bernard Rollet, Lyon, both of France

[73] Assignee: Rhone-Poulenc S.A., Paris, France

[22] Filed: Mar. 15, 1974

[21] Appl. No.: 451,557

[30] Foreign Application Priority Data
Mar. 19, 1973 France .............................. 73.09751

[52] U.S. Cl. ............................ 260/30.2; 260/33.4 R
[51] Int. Cl. .............................................. C08g 51/44
[58] Field of Search ........ 260/30.2, 45.95 P, 33.4 R

[56] References Cited
UNITED STATES PATENTS

| | | | |
|---|---|---|---|
| 3,497,468 | 2/1970 | Ulmer | 260/30.2 |
| 3,546,152 | 12/1970 | Bolton | 260/33.4 R |
| 3,666,723 | 5/1972 | Kray | 260/30.2 |
| 3,671,481 | 6/1972 | Gattus | 260/30.2 |
| 3,763,075 | 10/1973 | Grundschober | 260/30.2 |
| 3,766,138 | 10/1973 | Crivello | 260/30.2 |
| 3,790,530 | 2/1974 | Koerner | 260/30.2 |
| 3,817,921 | 6/1974 | Brode | 260/30.2 |
| 3,817,926 | 6/1974 | Pauze | 260/33.4 R |

*Primary Examiner*—Joseph L. Schofer
*Assistant Examiner*—P. R. Michl
*Attorney, Agent, or Firm*—Stevens, Davis, Miller & Mosher

[57] ABSTRACT

A process is disclosed for stabilising the viscosity of a solution of a polyamide-imide obtained from trimellitic anhydride and from an aromatic diisocyanate and a solvent which is at least partly 2-N-methylpyrrolidone, which comprises adding thereto 0.1 to 5% by weight of an alcohol of the formula: ROH in which R represents an aliphatic, cycloaliphatic or arylaliphatic radical containing 2 to 9 carbon atoms.

8 Claims, No Drawings

POLYAMIDE-IMIDE SOLUTIONS

This invention relates to polyamide-imide solutions.

It is currently well known to use polyamide-imide solutions for producing yarns or coverings intended to withstand high heat stresses or which are likely to come into contact with various chemical agents. However, the use of such solutions is frequently restricted because these solutions change on storage.

Various means have been proposed to overcome this disadvantage. Thus in French Pat. No. 2,085,912, which relates to the preparation of a polymer from a halide of trimellitic anhydride and from a diamine, it is proposed to add water or an alcohol to the reaction mixture before treating the latter with an alkylene oxide for the purpose of removing the hydrochloric acid formed. This technique makes it possible to reduce the tendencies of the polymer solution to gel. Another stabilisation technique is proposed in U.S. Pat. No. 3,562,787; the polyamide-imide used is prepared from trimellitic anhydride and from a diamine and the solution is stabilised by means of a mono-functional cyclic anhydride, an aliphatic or aromatic aldehyde or a mono-functional isocyanate.

A process has now been found, according to the present invention, for stabilising the viscosity of solutions containing a polyamide-imide produced from trimellitic anhydride and from an aromatic diisocyanate, and a solvent consisting wholly or partially of 2-N-methylpyrrolidone. According to this process 0.1 to 5% by weight of an alcohol of the formula: ROH in which the symbol R represents an aliphatic, cycloaliphatic or arylaliphatic radical containing 2 to 9 carbon atoms, is incorporated into this solution.

The polytrimellamide-imide which is preferably used in the invention is produced from bis(4-isocyanato-phenyl)-methane or bis(4-isocyanato-phenyl) ether. This polymer can be prepared at a temperature from 60° to 150°C, in accordance with the technique described in French Pat. No. 1,473,600. In the solutions used in this invention, the reduced specific viscosity of the polyamide-imide is preferably from 10 to 300 cm$^3$/g [measured at 25°C on a 5 g/l solution in N-methylpyrrolidone (NMP)].

The solvent used in the preparation of the compositions according to the invention is preferably N.M.P. It is, however possible to use, for example, mixtures comprising at least 50% by weight of NMP and a hydrocarbon such as xylene or toluene.

The concentration of the polyamide-imide solution is preferably from 10 to 40% (weight of polymer)/(weight of solution).

Amongst the alcohols which can be used in the process according to the invention, n-butanol and benzyl alcohol are preferred.

The alcohol ROH is preferably added to the polyamide-imide solution at ambient temperature and with stirring. The polymers are usually prepared in the solvent and the alcohol can be incorporated when the reaction ends. It is of course possible to add the alcohol some time after the preparation of the polymer solution.

It is also to be understood that the alcohol can be incorporated into the solution in several stages.

The solutions according to the invention exhibit noteworthy stability on storage. They can be used for a variety of purposes, especially for producing enamels on metal conductors and for preparing films.

The following Examples further illustrate the present invention.

EXAMPLE 1

414.4g of N-methylpyrrolidone, 100.8 g. of bis-(4-isocyanato-phenyl) ether and 76.8 g. of trimellitic anhydride are introduced successively into a 1l reactor which is flushed with nitrogen. After 30 minutes, the flow of nitrogen is stopped and the mixture is heated to 180°C over the course of 3 hours.

As soon as the temperature reaches 180°C, the injection of 280 g of N-methylpyrrolidone is begun. This injection lasts for 3 hours, during which time the temperature of the reaction mixture is raised to 190°C.

When the viscosity of the solution reaches 1,000 Po, it is cooled under a stream of nitrogen and is removed when the temperature has fallen to 80°C.

The reduced specific viscosity of the polymer is 186 cm$^3$/g. The concentration of the solution is 17.6% by weight.

A portion of this polytrimellamide-imide solution is divided into two equal parts. 2% by weight of benzyl alcohol are added to the first part, and its viscosity is determined immediately afterwards and then after storage at 25°C. The viscosity changes from 1,810 to 1,830 Po over the course of 120 days. The second part, to which the benzyl alcohol has not been added is stored under the same conditions as the first. Its viscosity changes from 2,030 Po initially to 3,030 Po after 120 days The viscosity is measured at 25°C by means of a falling ball apparatus.

EXAMPLE 2

790 g of NMP, 200 g of xylene, 257.5 g. of bis-(4-isocyanato-phenyl)-methane and 192.2 g of trimellitic anhydride are introduced successively under a stream of nitrogen, into a 2l reactor.

The temperature is raised to 125°C over the course of 3 hours and this temperature is maintained for 5 hours.

The reduced specific viscosity of the polymer is 50 cm$^3$/g (measured at 25°C on a solution of concentration 5 g/l in NMP). The concentration of the solution is 29%.

2% of benzyl alcohol are incorporated, with stirring, into a portion of this solution. The viscosity of the composition (measured by means of a Brookfield RVT apparatus with module 4 at a speed of 20 revolutions/minute) changes as follows (indicated by comparison with a portion of the same solution without adjuvant):

|  | Initial viscosity | Viscosity after — weeks at 25°C | | |
| --- | --- | --- | --- | --- |
|  |  | 2 | 4 | 8 |
| Control: | 76 poises 76 | 86.5 91 | 84.5 96.5 | 81 101 |

2% of n-butanol are incorporated into a portion of the control (viscosity 101 poises) and the solution is stored for a further month. There is no change in the viscosity during this storage. In contrast, the viscosity of the portion of the control which did not receive any adjuvant continued to change during storage (109 poises after 1 month).

EXAMPLE 3

Following the procedure described in Example 1 and with the same reagents, a polymer is prepared, the reduced specific viscosity of which is 190 cm$^3$/g.

The polymer solution is divided into two portions; 5% by weight of benzyl alcohol is incorporated into one portion (A), the other portion (B) serves as a control:

The following results are observed:

|  | Viscosity initial | after 20 months |
|---|---|---|
| Portion A | 1,280 | 1,740 |
| Portion B | 1,320 | 2,880 |

We claim:

1. Process for stabilising the viscosity of a solution of a polyamide-imide obtained from trimellitic anhydride and from an aromatic diisocyanate and a solvent which consists essentially of 2-N-methylpyrrolidone or at least 50% 2-N-methylpyrrolidone and a hydrocarbon, which comprises adding thereto 0.1 to 5% by weight of an alcohol of the formula: ROH in which R represents an aliphatic, cycloaliphatic or arylaliphatic radical containing 2 to 9 carbon atoms.

2. Process according to claim 1 in which the diisocyanate is bis-(4-isocyanato-phenyl)-methane or bis-(4-isocyanato-phenyl) ether.

3. Process according to claim 1, in which the concentration of the polyamide-imide solution is from 10 to 40% by weight based on the weight of the solution.

4. Process according to claim 1 in which the alcohol is n-butanol.

5. Process according to claim 1 in which the alcohol is benzyl alcohol.

6. Process according to claim 1 in which the solution has a reduced specific viscosity of 10 to 300 cm$^3$/g, measured at 25°C on a 5 g/l solution in N-methylpyrrolidone.

7. Process according to claim 1 in which the solvent consists wholly of 2-N-methylpyrrolidone.

8. A storage-stable solution in a solvent which consists essentially of 2-N-methylpyrrolidone or at least 50% of 2-N-methylpyrrolidone and a hydrocarbon of a polyamide-imide obtained from trimellitic anhydride and from an aromatic diisocyanate in N-methylpyrrolidone which contains, as viscosity stabiliser, 0.1 to 5% by weight of an alcohol of the formula: ROH in which R represents an aliphatic, cycloaliphatic or arylaliphatic radical containing 2 to 9 carbon atoms.

* * * * *